(12) United States Patent
Varigas (10) Patent No.: US 11,731,760 B2
(45) Date of Patent: Aug. 22, 2023

(54) RHOMBOHEDRAL-WING AIRCRAFT FOR VERTICAL TAKE-OFF AND/OR LANDING

(71) Applicant: FLY-R, Saint-Paul (FR)

(72) Inventor: François Varigas, Saint-Paul (FR)

( * ) Notice: Subject to any disclaimer, the term of this patent is extended or adjusted under 35 U.S.C. 154(b) by 286 days.

(21) Appl. No.: 16/605,001

(22) PCT Filed: Apr. 9, 2018

(86) PCT No.: PCT/FR2018/050881
§ 371 (c)(1),
(2) Date: Oct. 12, 2019

(87) PCT Pub. No.: WO2018/197772
PCT Pub. Date: Nov. 1, 2018

(65) Prior Publication Data
US 2020/0156780 A1 May 21, 2020

(30) Foreign Application Priority Data

Apr. 24, 2017 (FR) ...................................... 1753513

(51) Int. Cl.
*B64C 29/00* (2006.01)
*B64C 3/10* (2006.01)
(Continued)

(52) U.S. Cl.
CPC ............ *B64C 29/0033* (2013.01); *B64C 3/10* (2013.01); *B64C 25/04* (2013.01); *B64C 27/28* (2013.01); *B64C 39/068* (2013.01); *B64U 30/20* (2023.01)

(58) Field of Classification Search
CPC ... B64C 29/0033; B64C 27/28; B64C 39/068; B64C 25/52; B64D 27/02
See application file for complete search history.

(56) References Cited

U.S. PATENT DOCUMENTS 2,193,448 A * 3/1940 David ................... B64C 23/005
244/56
2,577,385 A 12/1951 Troendle
(Continued)

FOREIGN PATENT DOCUMENTS

DE 20111224 U1 1/2002
FR 383375 A 3/1908
(Continued)

OTHER PUBLICATIONS

Cheng et al., Morphing Concept for Multirotor UAVs Enabling Stability Augmentation and Multiple-Parcel Delivery, Jan. 2019, AIAA Scitech Forum (Year: 2019).*

(Continued)

*Primary Examiner* — Richard Green
*Assistant Examiner* — Madison Elizabeth Dittner
(74) *Attorney, Agent, or Firm* — Patshegen IP; Moshe Pinchas (57) ABSTRACT

The aircraft (10) comprises a fuselage (11) and a rhombohedral wing structure (12) comprising front wings (13, 14) mounted on a front wing-root support (17) and rear wings (15, 16) mounted on a rear wing-root support (18).
At least two wings (13, 14) support an engine (24, 26) provided with a propeller (25, 27).
The rear end of the fuselage supports an engine (21) provided with a propeller (22).
The aircraft comprises means (28 to 35) for tilting said engines, the rotary shaft of each of the propellers being tilted between an orientation parallel to the main axis of the fuselage and an orientation perpendicular to the main axis of the fuselage and to an axis extending through the ends of the front wings.

13 Claims, 8 Drawing Sheets

(51) Int. Cl.
  *B64C 25/04* (2006.01)
  *B64C 27/28* (2006.01)
  *B64C 39/06* (2006.01)
  *B64U 30/20* (2023.01)

(56) References Cited

U.S. PATENT DOCUMENTS

| | | | | |
|---|---|---|---|---|
| 3,834,654 | A * | 9/1974 | Miranda | B64C 39/068 244/13 |
| 4,146,199 | A * | 3/1979 | Wenzel | B64C 39/068 244/45 R |
| 4,685,641 | A * | 8/1987 | Kirsch | B64C 25/52 244/105 |
| 5,046,684 | A * | 9/1991 | Wolkovitch | B64C 39/068 244/7 A |
| 9,365,088 | B2 * | 6/2016 | Belik | B64C 25/52 |
| 9,499,266 | B1 * | 11/2016 | Garreau | B64C 39/068 |
| 10,988,245 | B2 * | 4/2021 | Rudraswamy | B64C 27/28 |
| 2006/0144991 | A1 * | 7/2006 | Frediani | B64C 39/068 244/45 R |
| 2017/0240274 | A1 * | 8/2017 | Regev | B64D 35/08 |

FOREIGN PATENT DOCUMENTS

| | | | | |
|---|---|---|---|---|
| FR | 2521521 | A1 | 8/1983 | |
| FR | 2830839 | A1 | 4/2003 | |
| WO | 2016/016889 | A1 | 2/2015 | |
| WO | WO-2015019255 | A1 * | 2/2015 | ........... B64C 39/068 |
| WO | 2015/143093 | A2 | 9/2015 | |
| WO | 2016/016889 | A1 | 2/2016 | |

OTHER PUBLICATIONS

ISR; European Patent Office; NL Jun. 8, 2018.

* cited by examiner

RHOMBOHEDRAL-WING AIRCRAFT FOR VERTICAL TAKE-OFF AND/OR LANDING

TECHNICAL FIELD

The present invention relates to a rhombohedral-wing aircraft for vertical take-off and/or landing. It applies, in particular, to airplanes and drones for which the orientation of the axis of their propellers permits, firstly, level flight and, secondly, vertical landing or take-off.

STATE OF THE ART

Since the beginning of aeronautics, designers have always been concerned with designing an airplane that has the largest possible flight envelope while minimizing the structure's mass. Reminder: the flight envelope of an aircraft is the range in terms of airspeed, load factor and altitude within which it can operate safely.

With new technologies, new materials and ever more powerful computation means, new aircraft designs are appearing.

Rhombohedral, closed, diamond, slotted, ring and other wings have been considered since the very beginnings of aviation. It wasn't until fairly recently that aerodynamic thrust studies, thanks to new computational and digital simulation tools, demonstrated their potential gain in terms of induced drag, even if this gain is relatively modest (of the order of a few percent). On the other hand, the mass of the structure is significantly reduced (a gain of about 30%) by the natural bracing of the wings to each other, but at the price of increased rigidity.

Rhombohedral-wing aircraft do, however, have the drawback of needing a runway in order to be able to land or take off.

DESCRIPTION OF THE INVENTION

The present invention aims to remedy all or part of these drawbacks.

To this end, according to a first aspect, the present invention relates to an aircraft comprising a fuselage and a rhombohedral wing structure comprising front wings mounted on a front wing-root support and rear wings mounted on a rear wing-root support, wherein:
- at least two wings support an engine provided with a propeller;
- the rear end of the fuselage supports an engine provided with a propeller; and
- the aircraft comprises means for tilting said engines, the rotary shaft of each of the propellers being switched between an orientation parallel to the main axis of the fuselage and an orientation perpendicular to the main axis of the fuselage and to an axis extending through the ends of the front wings.

Therefore, for flight, the shafts of the propellers are positioned parallel to the axis of the fuselage, whereas, in landing, hovering flight or take-off, the shafts of the propellers are vertical.

This vertical landing aircraft has a payload capacity and range very close to those of the same aircraft without means for tilting the engines. This is somewhat paradoxical since, generally, vertical landing airplanes are heavier than conventional airplanes for the same performance levels.

In some embodiments, the axis that is perpendicular to the main axis of the fuselage and to the axis extending through the ends of the front wings, and which extends through the center of gravity of the aircraft, passes through the escribed triangle extending through the propellers.

Thanks to the presence of at least three engines provided with propellers at the apexes of a triangle, the hovering flight is stable.

In some embodiments, the propeller at the rear end of the fuselage is positioned below the main axis of the fuselage when this propeller's shaft is in an orientation perpendicular to the main axis of the fuselage.

Thanks to these provisions, the rear wings can extend to the rear engine without limiting the clearance of the rear propeller.

In some embodiments, a concavity of the fuselage at the rear end of the fuselage constitutes a housing forming a protective cowling for the rear propeller, the blades of the rear propeller traversing this concavity when the rotary shaft of the propellers is perpendicular to the main axis of the fuselage.

Thanks to these provisions, the rear propeller is protected in the vertical flight configuration and the rear propeller benefits from a more efficient pusher configuration.

In some embodiments, when the rotary shaft of the propellers is parallel to the main axis of the fuselage, the centers of the front propellers are positioned lower, relative to the fuselage of the aircraft, than the center of the rear propeller and, when the rotary shaft of the propellers is perpendicular to the main axis of the fuselage, the centers of the front propellers are positioned higher than the center of the rear propeller.

The positioning, in horizontal flight configuration, of the front propellers lower than the rear propeller favors the inclination of the aircraft providing lift. In vertical flight configuration, the positioning of the front propellers higher than the rear propeller provides the rear propeller with a more efficient pusher configuration, aerodynamically speaking, and therefore enables greater power modulation to provide balance during the landing phase, which can be tricky because of the effects of wind and sun.

In some embodiments, when the rotary shaft of the propellers is perpendicular to the main axis of the fuselage, the centers of the front propellers are positioned above the main axis of the fuselage and, when the rotary shaft of the propellers is parallel to the main axis of the fuselage, the centers of the front propellers are positioned below the main axis of the fuselage.

The vertical flight stability is therefore reinforced since the center of thrust is above the center of gravity.

In some embodiments, the front wing-root support forms a landing skid.

In this way, the structure and wings of the aircraft are protected during landing.

In some embodiments, the engines of the wings are mounted on the neutral torsional axis of the front wings. The stresses applied on the wings are therefore reduced.

In some embodiments, the engines are at the apexes of an isosceles triangle whose smallest angle is less than 45 degrees.

In some embodiments, the smallest angle of the triangle formed by the engines is more than 50 degrees.

This triangle close to an equilateral triangle increases the stability of the aircraft in vertical flight.

In some embodiments, the propellers of the engines borne by the wings are positioned above the wings when the shafts of these propellers are in an orientation perpendicular to the main axis of the fuselage.

In some embodiments, the propellers of the engines borne by the wings are positioned upstream from the front wings, in the direction of flight of the aircraft.

Aerodynamically, having the front wings blown accentuates the rhomboid effect and significantly increases the efficiency of the control surfaces and the variation in camber of the blown wings. This leads to an increase in the performance levels of the airplane at low speeds and a reduction in drag. This reduction is significant for aircraft with spans of over five meters.

Because of the propeller wash, the flows around the wings, especially the front wings, are much cleaner and better controlled. As a result, they allow the flaps to be more efficient, especially in the down position to increase lift.

Having two engines on the front wings makes yaw control possible, unlike a pure rhomboidal wing. This can be very important in some flight phases, in specific mission scenarios.

In some embodiments, the wing-root supports are positioned respectively below and above the fuselage.

This is the optimum configuration.

In some embodiments, a vertical surface for closing wing ends is positioned at each junction of the front and rear wing ends.

These vertical surfaces for closing wing ends allow the drag of the wing structure to be reduced.

In some embodiments, landing skids are formed from vertical extensions to the base of the vertical surfaces for closing wing ends.

These landing skids protect the structure and wings of the aircraft during landing.

In some embodiments, the fuselage has no vertical tail.

BRIEF DESCRIPTION OF THE FIGURES

Other advantages, aims and characteristics of the present invention will become apparent from the description that will follow, made, as an example that is in no way limiting, with reference to the drawings included in an appendix, wherein.

DESCRIPTION OF EMBODIMENTS OF THE INVENTION

It is now noted that the figures are not to scale. To simplify the understanding of the drawings and schematics, the wings and vertical surfaces at the junction of the wing ends are represented by thin surfaces.

FIGS. 1 to 6 show an aircraft 10 comprising a fuselage 11 and a rhombohedral-shaped wing structure 12.

It is noted that a rhombohedral (or rhombohedric) wing structure is a variant of a tandem wing in which the ends come together. The front wing fixed on the lower portion of the fuselage is in a swept-back configuration, and the rear wing fixed on the upper portion of the fin is in a swept-forward configuration; the complete wing, referred to as a joined wing, forms a continuous projected surface formed of a hollow rhombus.

Figure 5:
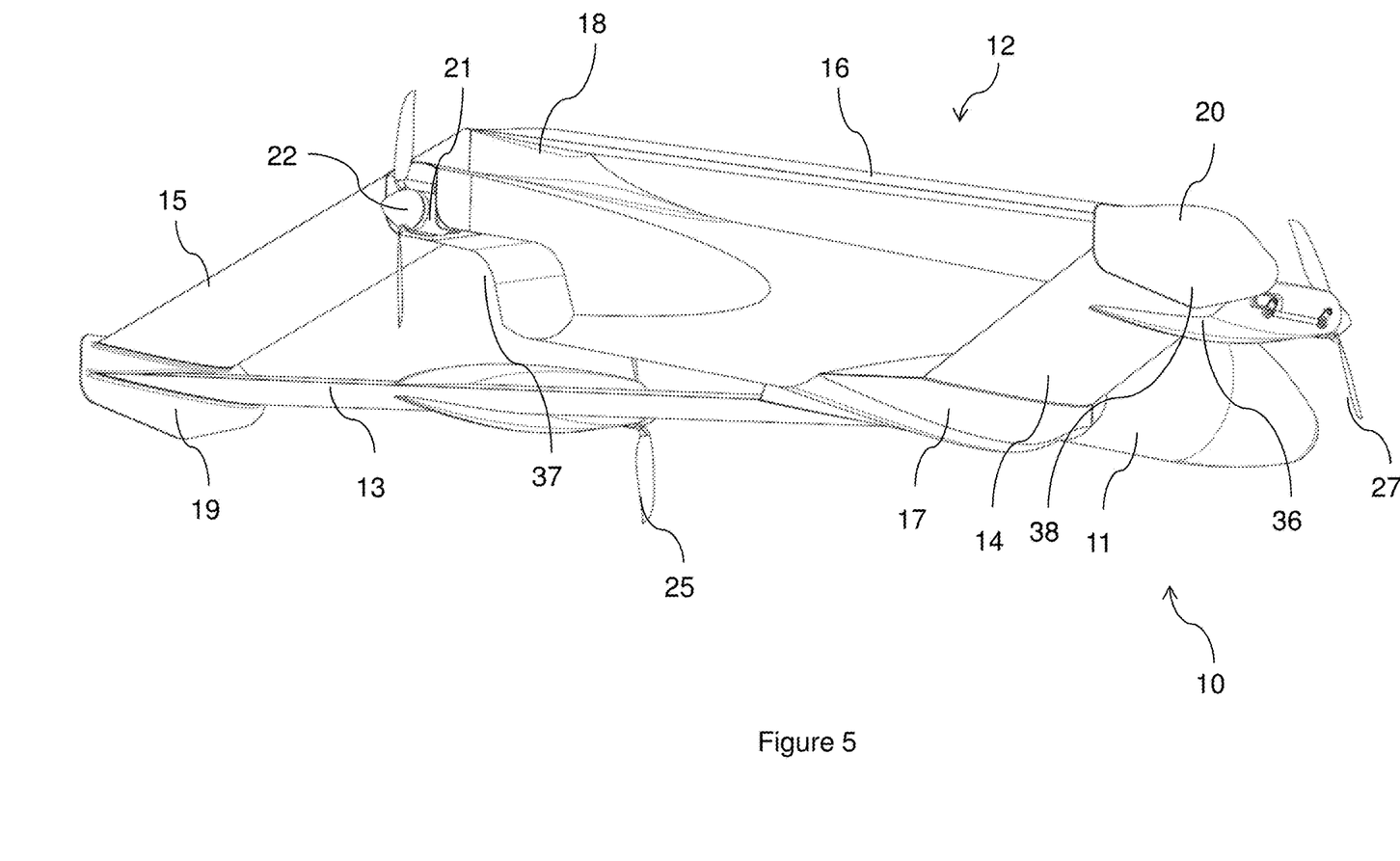
FIG. 5 shows, schematically and a perspective view, the aircraft shown in FIGS. 1 to 4, in a horizontal flight configuration.
Figure 6:
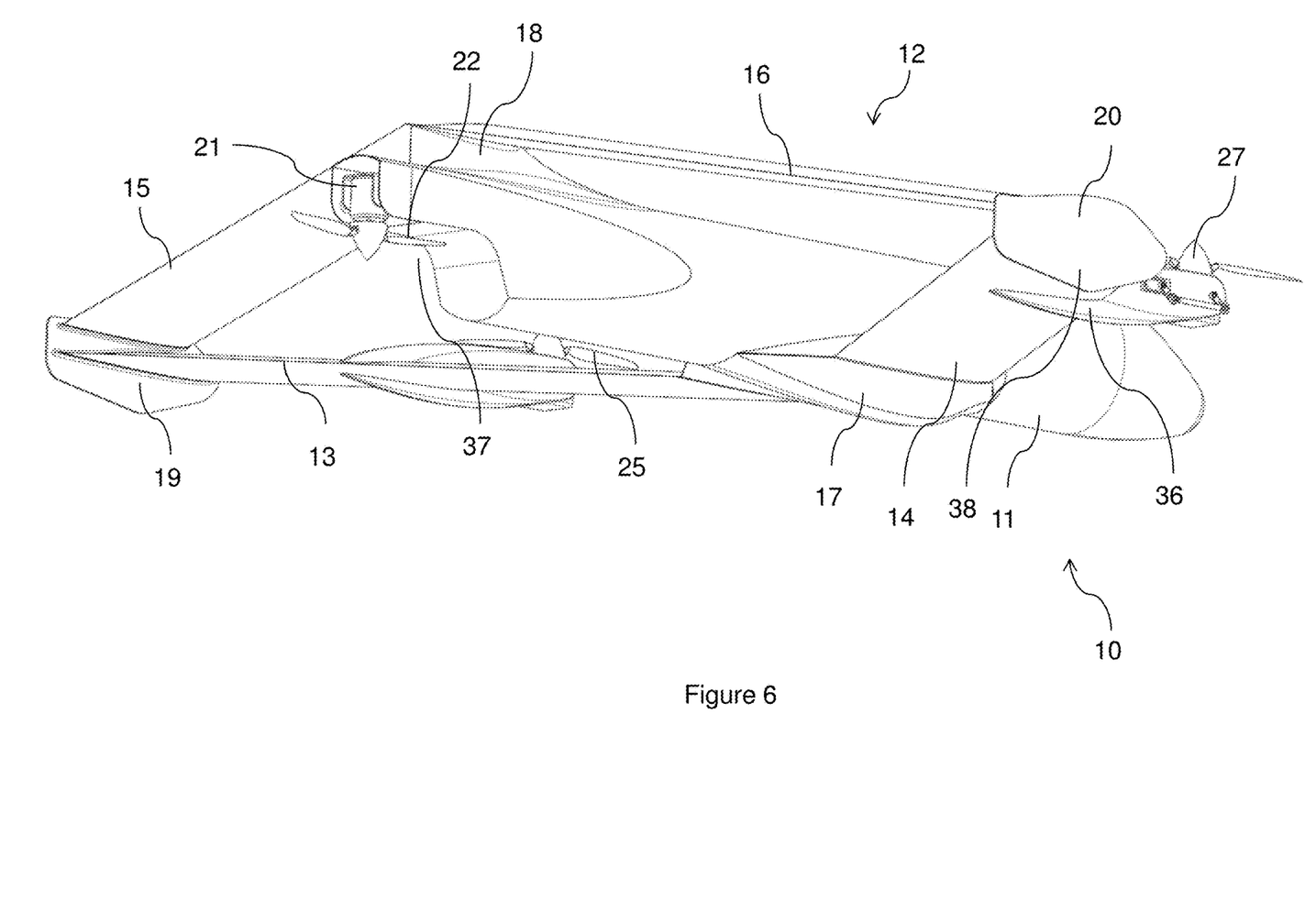
FIG. 6 shows, schematically and a perspective view, the aircraft shown in FIGS. 1 to 4, in a vertical flight configuration.

The wing structure 12 comprises a left front wing 13, a right front wing 14, a left rear wing 15, and a right rear wing 16. The front wings 13 and 14 come together on a front wing-root support 17 located below the fuselage 11. The rear wings 15 and 16 come together on a rear wing-root support 18. As shown in the figures, the wing-root supports 17 and 18 are preferably positioned respectively below and above the fuselage 11, this configuration being optimum for several aspects. The figures also show that the fuselage 11 has no vertical tail. As shown in FIGS. 5 and 6, the front wing-root support 17 forms a landing skid, jointly with the vertical extensions to the base 38 of the vertical aerodynamic surfaces, 19 and 20, for closing wing ends. FIGS. 5 and 6 also show engine pylons 36 for incorporating the engine and the rotation/tilting mechanism.

The left wings 13 and 15 come together on a left wing junction located above the fuselage 11. The right wings 14 and 16 come together on a right wing junction. A vertical surface, 19 on the left side and 20 on the right side, for closing wing ends is positioned at each junction of the front and rear wing ends.

The closing of the wing ends, to obtain a wing with an almost infinite aspect ratio, consists of a vertical aerodynamic surface 19 or 20 (profiled or not). One of the characteristics of rhombohedral wings is the absence of a vertical surface, and therefore a tangible improvement in profile drag. This vertical surface 19 or 20 that joins the two wings at their ends makes it possible to close the space and therefore, in theory, have a wing similar to an infinite-span wing.

Each of the wings 13, 14, 15 and 16 shown in the figures are broadly rectangular in shape. They are therefore constant-chord wings, their leading edges and trailing edges being parallel. Of course, the present invention is not limited to this type of general form but extends to all wing shapes other than delta wings.

The front wings 13 and 14 have control surfaces (not shown), ailerons or flaps. The rear wings 15 and 16 have control surfaces (not shown), ailerons or flaps.

At the rear of the fuselage 11, a motor 21 rotationally drives a propeller 22 to propel the aircraft 10. The left front wing 13 bears a motor 24 rotationally driving a propeller 25. The right front wing 14 bears a motor 26 rotationally driving a propeller 27.

The aircraft 10 is therefore propelled by an engine 21 with propeller 22, located at the rear of the fuselage 11, and by engines 24 and 26 with propellers 25 and 27 respectively, borne by the front wings 13 and 14, respectively.

Figure 1:
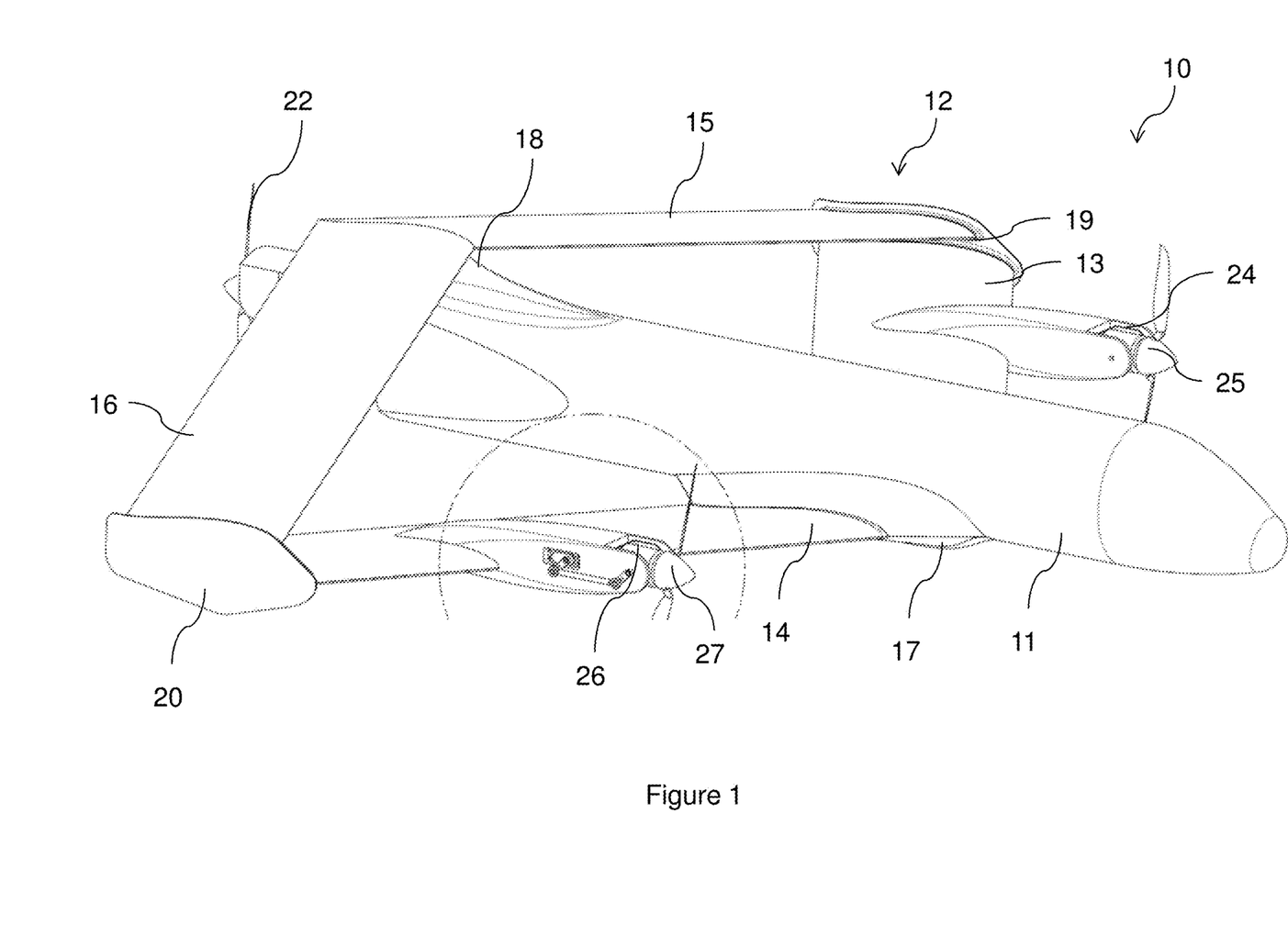
FIG. 1 shows, schematically and in a perspective view, a particular embodiment of the aircraft that is the subject of the present invention in a horizontal flight configuration.
Figure 2:
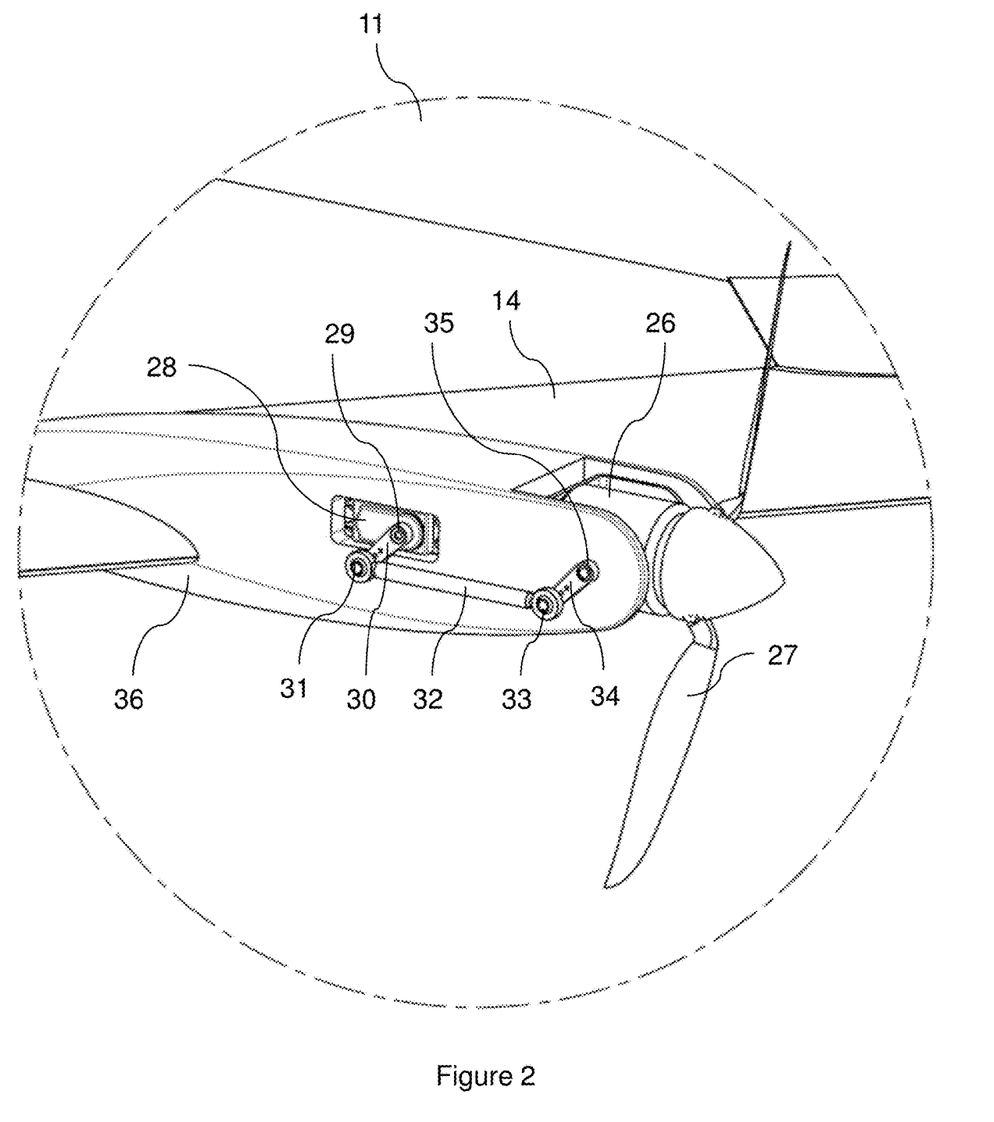
FIG. 2 shows a detailed view of FIG. 1.
Figure 3:
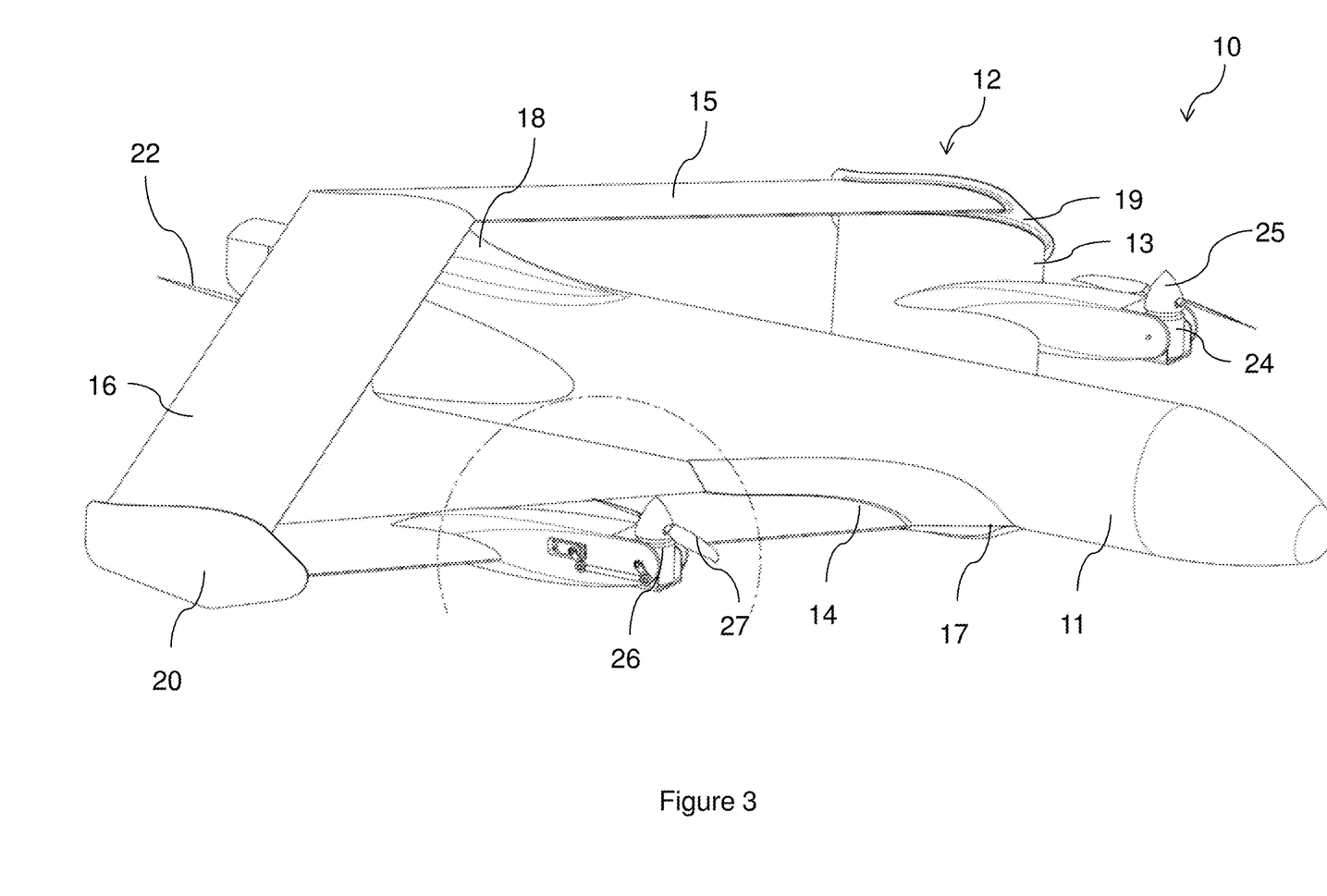
FIG. 3 shows, schematically and in a perspective view, the aircraft shown in FIGS. 1 and 2, in a vertical flight configuration.
Figure 4:
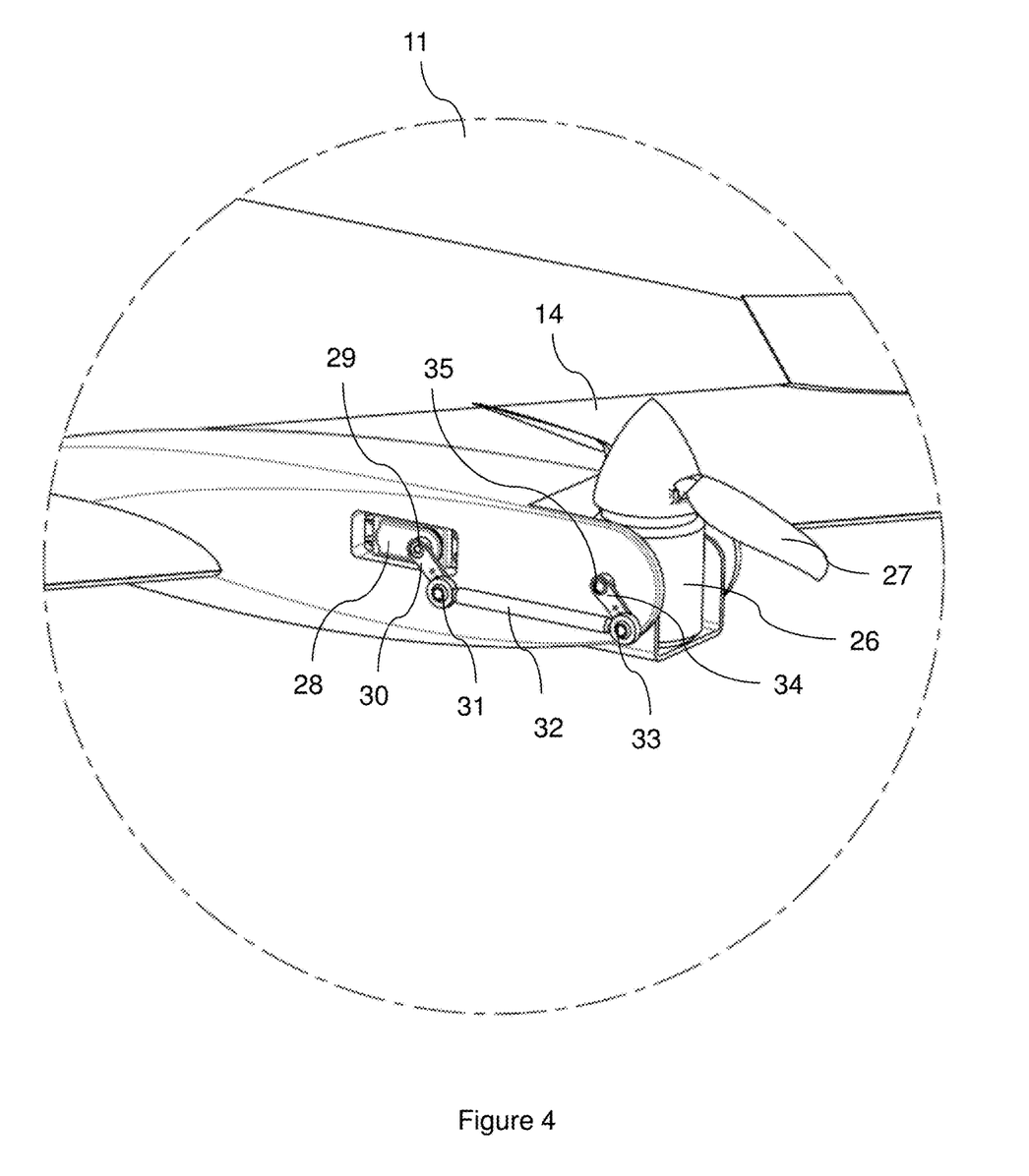
FIG. 4 shows a detailed view of FIG. 3.

FIGS. 2 and 4 show a servo-motor 28 setting in rotation a shaft 29 attached to one end of a straight rod 30. The other end of the rod 30 is mounted on a pivot 31, which drives a connecting rod 32 transferring the movement of the pivot 31 to a pivot 33. One end of a straight drive rod 34 is mounted on the pivot 33. The other end of the rod 34 is attached to a rotary shaft 35 of the engine 26. In this way, the actuation of the servo-motor causes the plane of rotation of the propeller 27 to switch from a vertical configuration (FIG. 2) for horizontal flight to a horizontal configuration (FIG. 4), for hovering or vertical flight, for example for a landing or take-off phase. Of course, the other two engines, 21 and 24, are provided with servo-motors and similar mechanical systems that perform the tipping of the engines. The rotary shaft of each of the propellers, 22, 25 and 27, switches between an orientation referred to as "horizontal", parallel to the main axis of the fuselage 11 (FIGS. 1, 2 and 5), and an orientation referred to as "vertical", perpendicular to the main axis of the fuselage 11 and to an axis extending through the ends of the front wings.

Therefore, for fast flight, the shafts of the propellers, 22, 25 and 27, are in the "horizontal" position, whereas, in landing, hovering flight or take-off, the shafts of the propellers, 22, 25 and 27, are in the vertical position. This vertical landing aircraft 10 has a payload capacity and range very close to those of the same aircraft without means for tilting engines.

Preferably, the actuations of the three servo-motors 28 are synchronized. On the other hand, the rotation speeds of the engines, 21, 24 and 26, and propellers, 22, 25 and 27, are controlled independently.

In the case of a drone, an electronic control unit (not shown) comprises a central processing unit which actuates the servo-motors and controls the engines in a coordinated way. The electronic control unit also performs control functions commanding control surfaces ailerons and flaps, in a way known in and of itself.

The vertical axis, which is perpendicular to the main axis of the fuselage 11 and to the axis extending through the ends of the front wings and which extends through the center of gravity of the aircraft 10, passes through the escribed triangle extending through the propellers 22, 25 and 27. Therefore, the hovering flight is stable.

As can be seen in FIGS. 5 and 6, in the embodiment shown, the propeller 22 at the rear end of the fuselage 11 is positioned below the main axis of the fuselage 11 when the shaft of this propeller 22 is in a vertical orientation. The rear wings, 15 and 16, can therefore extend to the rear engine 21 without limiting the clearance of the rear propeller 22.

The housing forming a protective cowling 37 for the propeller 22 at the rear end of the fuselage is incorporated into the fuselage 11. For this purpose, the fuselage 11 has, below its rear end, a concavity 37 traversed by the blades of the propeller 22 during flight in the vertical configuration.

The propellers 25 and 27 of the engines 24 and 26 borne by the wings 13 and 14 are positioned above the wings when the shafts of these propellers are in the vertical position. As shown in the figures, the propellers 25 and 27 of the engines 24 and 26 borne by the wings 13 and 14 are positioned upstream from the front wings, in the direction of flight of the aircraft 10.

Aerodynamically, having the front wings blown accentuates the rhomboid effect and significantly increases the efficiency of the control surfaces and the variation in camber of the blown wings. This leads to an increase in the performance levels of the airplane at low speeds and a reduction in drag. This reduction is significant for aircraft with spans of over five meters.

Because of the wash from the propellers 25 and 27, the flows around the wings, especially the front wings 13 and 14, are much cleaner and better controlled. As a result, they allow the flaps to be more efficient, especially in the down position to increase lift.

Having two engines 24 and 26 on the front wings 13 and 14 makes yaw control possible, unlike a pure rhomboidal wing. This can be very important in some flight phases, in specific mission scenarios.

The inventor has discovered that the rhombohedral configuration makes it possible to keep an almost constant lift/drag ratio over a large range of speeds by varying the camber of the front wings—and the rear wings to maintain a balanced flight. This particularity has been confirmed in wind-tunnel tests. The use of wing morphing is especially suitable since a small angular variation in the front and rear wings can introduce significant variations in incidence and/or in camber over their span. This makes it possible to limit the use of flap deflections, which have the drawback of the complexity of the mixes of the eight flaps and the lack of precision/resolution of the servomotors and of the mechanical controls of these servomotors.

Morphism is a very elegant solution for "fine-tuning" the adjustment of the wing structure to the flight conditions without having the drawback of solutions that are cumbersome and aerodynamically not very suitable for the multiple flaps on the trailing edge and/or the slats and other appendages on the leading edge. The rhombohedral type of wing structure lends itself particularly well to this type of "control".

Preferably, the engines 24 and 26 are mounted on the neutral torsional axis of the front wings 13 and 14. In some variants, varying the angular orientation of the servo-motors—and therefore the axis of rotation of the propellers—is used to compensate for the variation in angular orientation induced by the bending of the wings resulting from the morphing.

Figure 7:
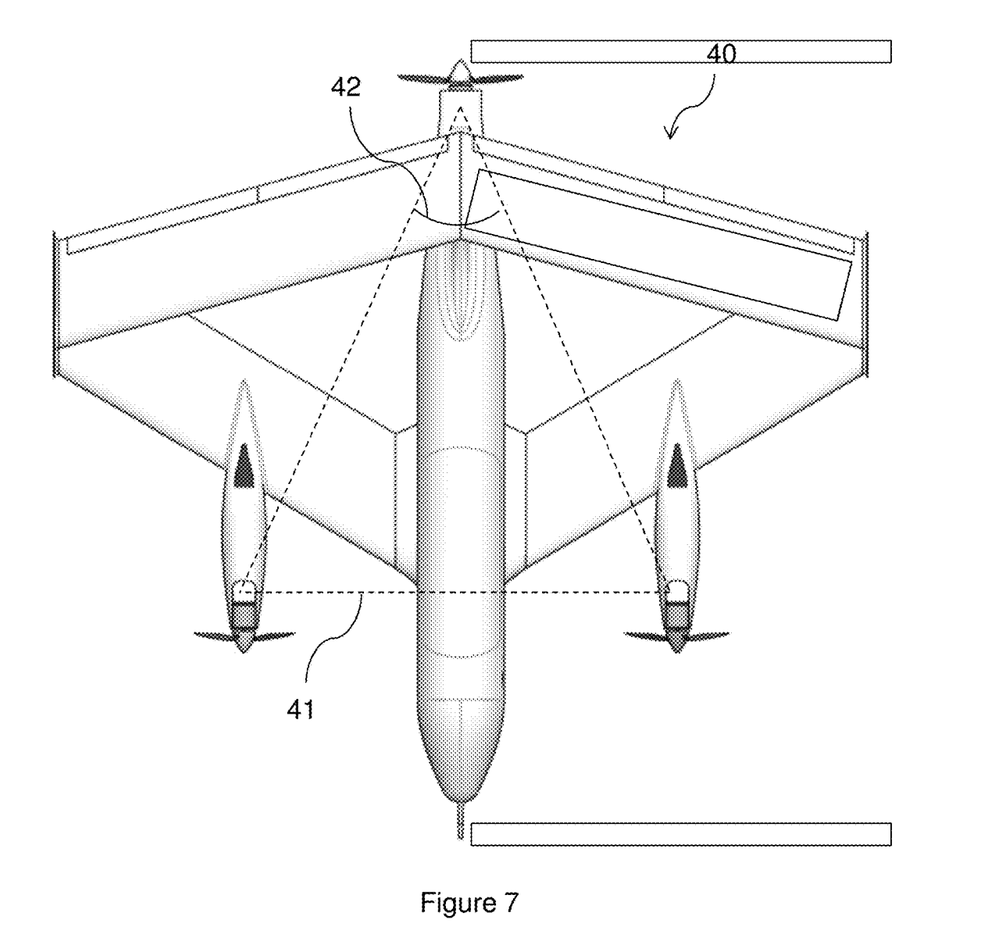
FIG. 7 shows, schematically and in a top view, a particular embodiment of the aircraft that is the subject of the present invention, in a horizontal flight configuration.
Figure 9:
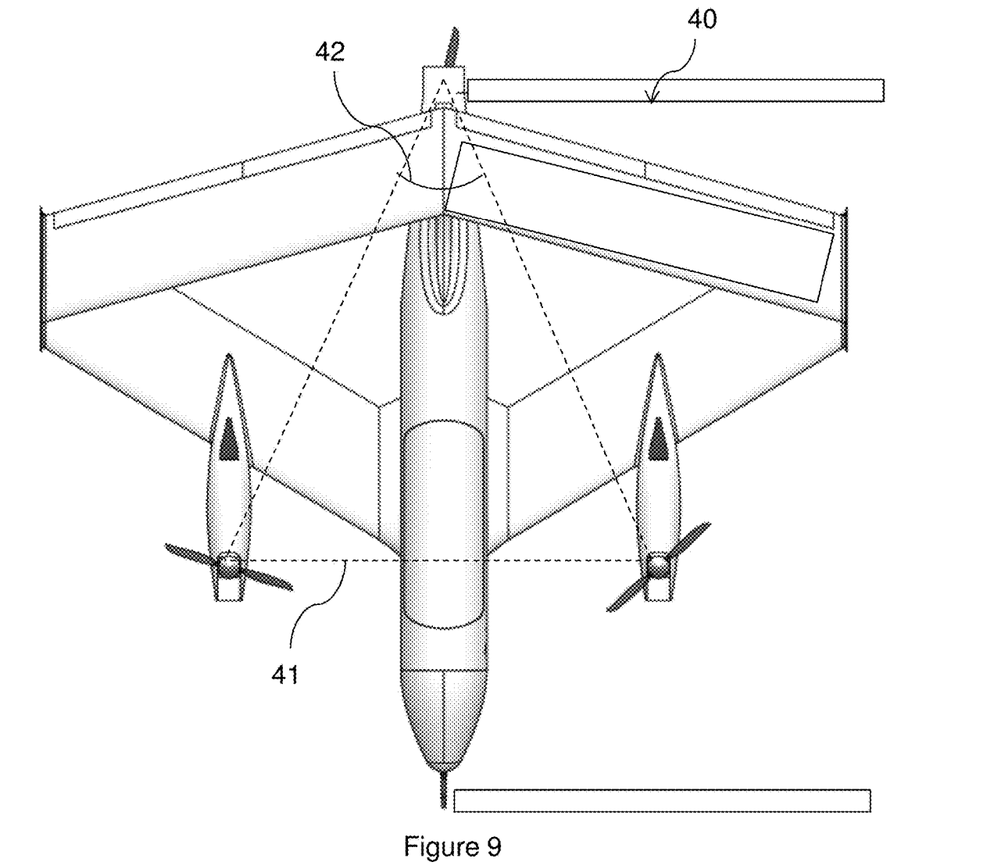
FIG. 9 represents, schematically and in a top view, the aircraft shown in FIG. 7, in a vertical flight configuration.

As can be seen in FIGS. 7 and 9, in the aircraft 40, which has the same technical characteristics as the aircraft 10, the engines 21, 24 and 26 are positioned in an isosceles triangle 41 having its smallest angle greater than 45 degrees and, preferably, greater than 50 degrees.

This triangle increases the stability of the aircraft in vertical flight. This triangle also satisfies the law of equilibrium when the three propellers are tilted for the vertical flight configuration. For reasons of balance, when the engines are switched into the horizontal flight position, and to respect the center of gravity of the aircraft, it can be beneficial to keep the two front engines/propellers identical (but counter-rotating) and to place the rear engine/propeller unit at a greater distance (isosceles triangle) with, as a result, lower power/traction. This is also of benefit for optimizing propulsion, since a pusher configuration is more efficient, aerodynamically speaking, and therefore requires less power/energy.

Balancing the forces during vertical flight is important: the moment created by the two front propellers needs to be equivalent to the moment created by the rear propeller relative to the center of gravity of the aircraft. To obtain this balance, it is necessary to vary either the power (rotation speeds and pitch of the propeller) or distances of the points of application of forces relative to the center of gravity.

For reasons of stability in horizontal flight, the static margin necessary for the longitudinal stability of the aircraft must be respected during the tilting of the engine/propeller units. This is inherent in the distribution of mass and therefore in the overall design of the aircraft with its components and their respective masses in this configuration.

The two front engines 24 and 26 tilt upwards to switch to the vertical flight configuration while the rear engine 21 tilts downwards. These tilt/rotation directions are more efficient in making it possible to better free the propellers 22, 25 and 27 from any masking by the aircraft structure.

Figure 8:
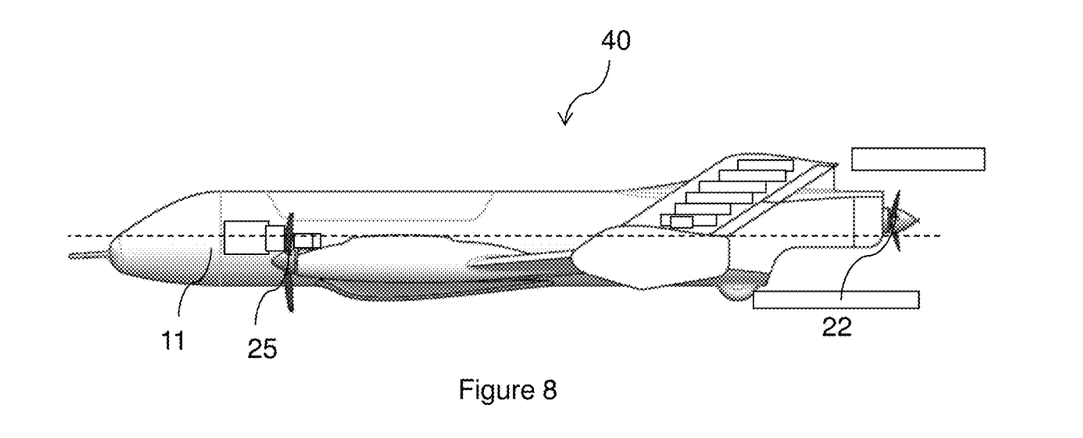
FIG. 8 shows, schematically and in a side view, the aircraft shown in FIG. 7.
Figure 10:
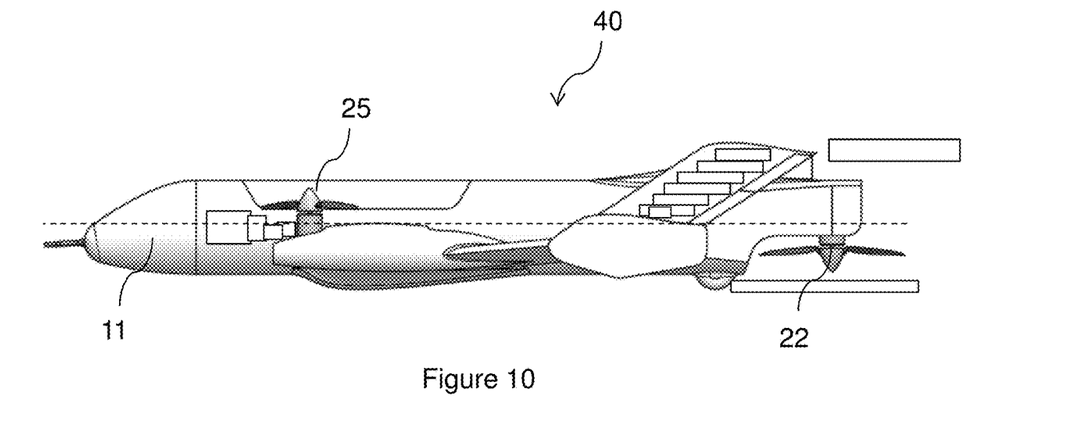
FIG. 10 shows, schematically and in a side view, the aircraft shown in FIG. 9.

FIGS. 8 and 10 show that, in the horizontal flight configuration, the centers of the front propellers 25 and 27 are positioned lower, relative to the fuselage 11 of the aircraft 40, than the center of the rear propeller 22, which favors the inclination of the aircraft providing lift. Conversely, in the horizontal flight configuration, the centers of the front propellers 25 and 27 are positioned higher than the center of the rear propeller 22. The rear propeller 22 therefore benefits from a more efficient pusher configuration, aerodynamically speaking, thereby enabling greater power modulation to provide balance during the landing phase, which can be tricky because of the effects of wind and sun. In vertical flight configuration, the centers of the front propellers are positioned above the main axis of the fuselage 11. The vertical flight stability is therefore reinforced since the center of thrust is above the center of gravity. In horizontal flight configuration, the centers of the front propellers 25 and 27 are positioned below the main axis of the fuselage 11.

It is noted that the aircraft 10 can be launched by a catapult, pyrotechnic means and/or a spring, and recovered in a net.

The invention claimed is:

1. Aircraft comprising:
   a fuselage having a main axis extending along a horizontal plane and a vertical axis extending along a vertical plane, said main axis passes through a center of gravity of the aircraft;
   a rhombohedral wing structure comprising a pair of left and right front wings mounted on a front wing-root support coupled to a front bottom portion of said fuselage and a pair of left and right rear wings mounted on a rear wing-root support coupled to a top rear portion of said fuselage;
   wherein an end of said right front wing is connected to an end of said right rear wing forming a right junction, and an end of said left front wing is connected to a free end of said left rear wing forming a left junction;
   wherein each of the right and left junctions includes a horizontal angle defined between the front and rear wings, said horizontal angle extends with respect to said horizontal plane, and wherein each of the right and left junctions further includes a vertical angle defined between the front and rear wings said vertical angle extends with respect to said vertical plane, such that said front and rear wings form together a complete rhombohedral wing structure rhombus on said horizontal plane and said vertical plane;
   at least two front engines provided with a propeller, each engine being mounted on one of the front wings; and
   a rear engine provided with a propeller and being mounted on a rear end of the fuselage;
   wherein each of the front engines and the rear engine includes a rotary shaft configured to rotate the propellers between a parallel orientation in which the propellers are disposed in parallel with respect to the horizontal plane of the fuselage and a perpendicular orientation in which the propellers are disposed in perpendicular with respect to the horizontal plane of the fuselage; and,
   wherein each of the front engines and the rear engine includes a rotary shaft configured to rotate the propellers between a parallel orientation in which the propellers are disposed in parallel with respect to the horizontal plane of the fuselage and a perpendicular orientation in which the propellers are disposed in perpendicular with respect to the horizontal plane of the fuselage; and,
   wherein, in said parallel orientation the centers of the propellers of the front engines are positioned above the main axis and the center of the propeller at the rear end of the fuselage is positioned below the main axis, and in said perpendicular orientation the centers of the propellers of the front engines are positioned below the main axis of the fuselage and the center of the propeller at the rear end of the fuselage is positioned above the main axis.

2. The aircraft according to claim 1, wherein the axis that is perpendicular to the main axis of the fuselage and to the axis extending through the ends of the front wings, and which extends through the center of gravity of the aircraft, passes through an escribed triangle extending through the propellers.

3. The aircraft according to claim 1, wherein a concavity of the fuselage at the rear end of the fuselage constitutes a housing forming a protective cowling for the rear propeller, the blades of the rear propeller traversing this concavity when the rotary shaft of the propellers is parallel to the main axis of the fuselage.

4. The aircraft according to claim 1, wherein the front wing-root support forms a landing skid.

5. The aircraft according to claim 1, wherein the engines of the wings are mounted on the neutral torsional axis of the front wings.

6. The aircraft according to claim 1, wherein the engines are at the apexes of an isosceles triangle whose smallest angle is less more than 45 degrees.

7. The aircraft according to claim 6, wherein the smallest angle of the triangle formed by the engines is more than 50 degrees.

8. The aircraft according to claim 1, wherein the propellers of the engines borne by the wings are positioned above the wings when the shafts of these propellers are in an orientation perpendicular to the main axis of the fuselage.

9. The aircraft according to claim 1, wherein the propellers of the engines borne by the wings are positioned upstream from the front wings, in the direction of flight of the aircraft.

10. The aircraft according to claim 1, wherein the wing-root supports are positioned respectively below and above the fuselage.

11. The aircraft according to claim 1, wherein a vertical surface for closing wing ends is positioned at each junction of the front and rear wing ends.

12. The aircraft according to claim 11, wherein landing skids are formed from vertical extensions to the base of the vertical surfaces for closing wing ends.

13. The aircraft according to claim 1, wherein the fuselage has no vertical tail.

* * * * *